May 21, 1940.    M. NEIDHART    2,201,318
TEDDER FOR SPREADING CUT GRASS AND THE LIKE
Filed Oct. 12, 1938    2 Sheets-Sheet 1

Inventor:
Martin Neidhart
by Sommers & Young
Attorneys

May 21, 1940.  M. NEIDHART  2,201,318
TEDDER FOR SPREADING CUT GRASS AND THE LIKE
Filed Oct. 12, 1938    2 Sheets-Sheet 2
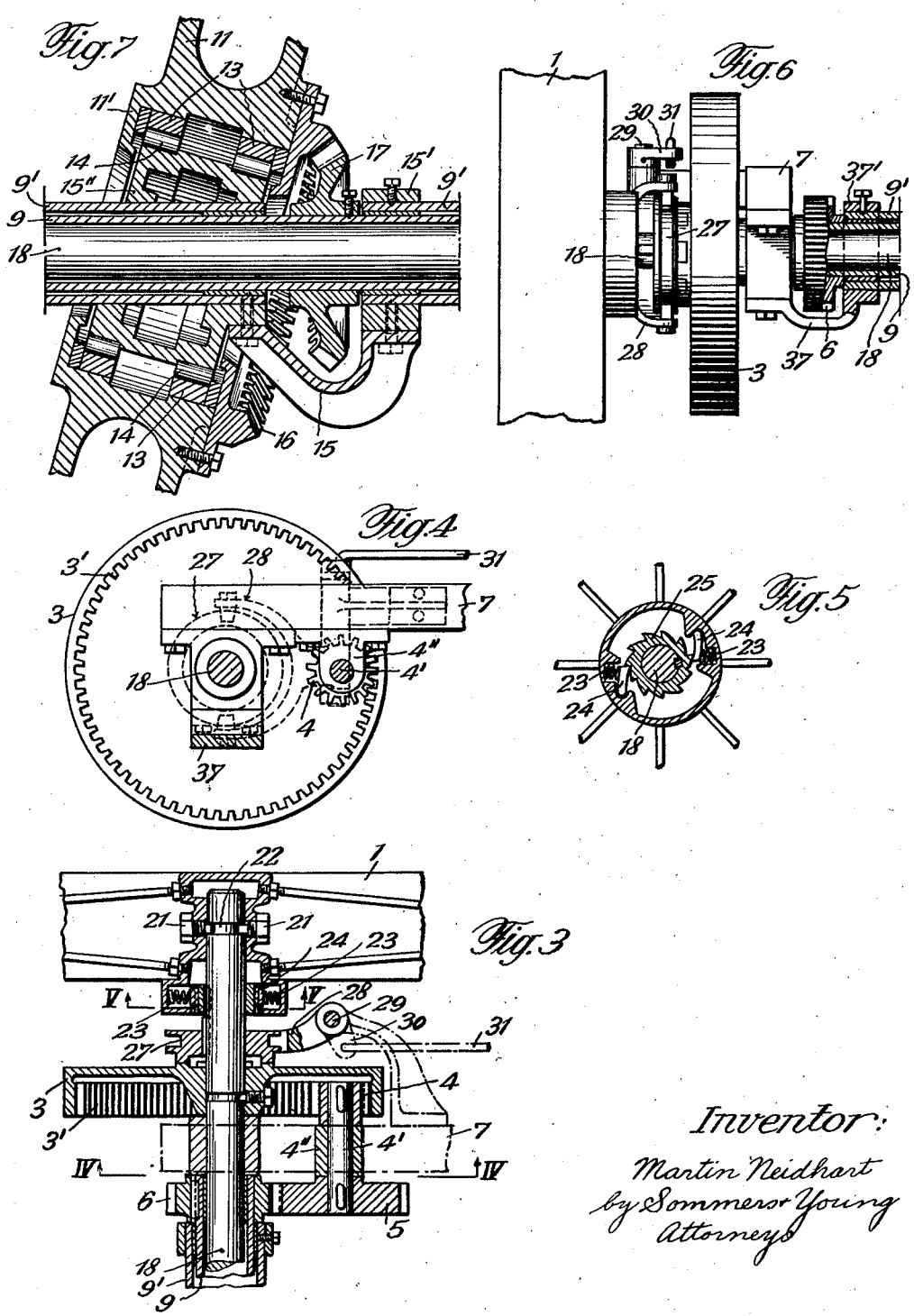

Patented May 21, 1940

2,201,318

UNITED STATES PATENT OFFICE 2,201,318

TEDDER FOR SPREADING CUT GRASS AND THE LIKE

Martin Neidhart, Bonstetten, Switzerland

Application October 12, 1938, Serial No. 234,702
In Switzerland October 30, 1937

2 Claims. (Cl. 56—372)

This invention relates to tedders for spreading cut grass and the like.

In previously-known machines for spreading cut grass or the like it is old to have the fork-supporting arms circulate about a supporting axle offset at the rear with respect to the wheel axle. A chief disadvantage of such constructions consist in that the distance from the ground to the rotating supporting arms of the forks varies, according to the unevenness of the ground, with respect to the constant level of the wheel axle, so that the forks can engage the material only incompletely or not at all, or will strike the ground, whereby the efficiency of operation is reduced. In addition, this arrangement of the supporting shaft of the fork arms behind the wheel axle brings with it additional or excessive weight, thus requiring a heavier chassis and correspondingly increased power for moving the machine.

In the machine of the present invention there is provided on the wheel axle differently inclined fork-supporting arms which circulate in different inclined planes about the wheel axle.

As a result, the axle of the fork-supporting arms has a constant, proper distance from the ground, which also assures proper engagement with the material on very uneven ground, while the different angles of the circulatory planes of the forks with respect to the wheel axle provide effective distribution or spreading of the material engaged by the forks, for example, even long grass. A simple and light construction, the weight of which is at the same time balanced and which is easily portable, is thus provided.

An embodiment of the invention is illustrated in the accompanying drawings in which Fig. 1 is a side sectional view taken on the line I—I of Fig. 2;

Fig. 3 is an axial section of one of the end portions of the road wheel axle on a larger scale;

Fig. 4 is a cross section on the line IV—IV in Fig. 3;

Fig. 5 is a cross section on the line V—V of Fig. 3;

Fig. 6 is a side elevation of the parts shown in Fig. 3; and

Fig. 7 shows an axial section of the drive of a support for forks inclined to the axis of the road wheel axle.

Figure 1:
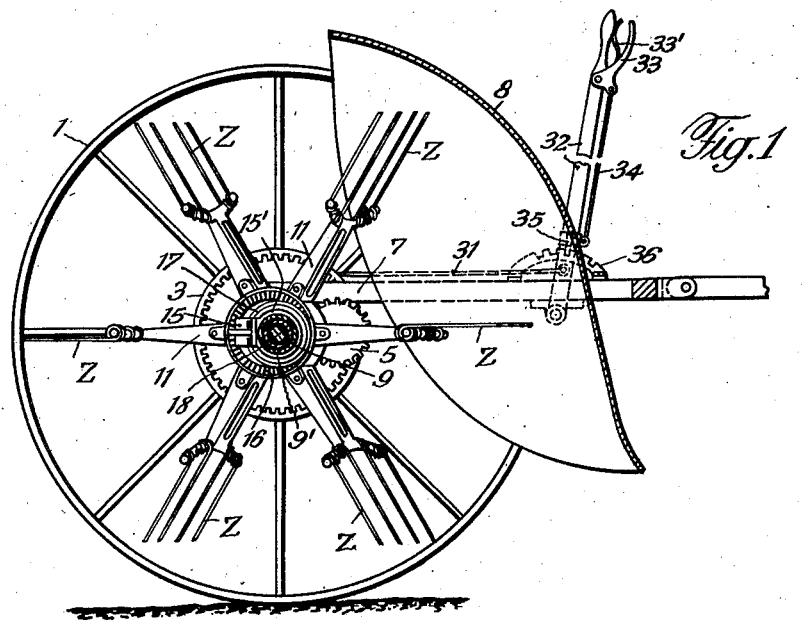
Figure 2:
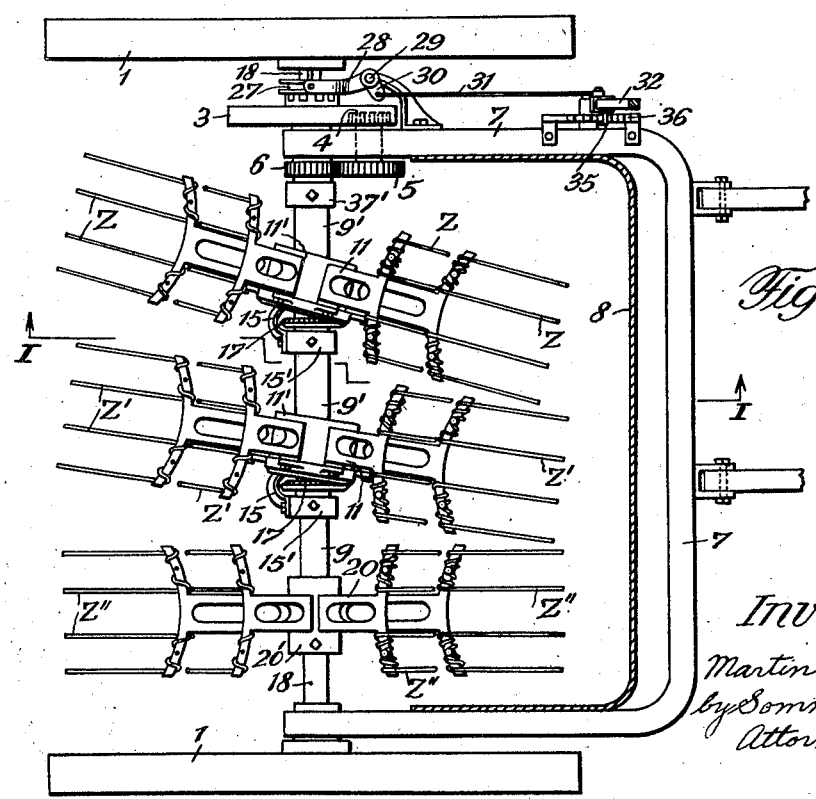
Fig. 2 is a plan view partly in section.

The two road wheels of the machine are designated by 1, whereas the numeral 18 refers to the axle of the road wheels.

On the hubs of the road wheels 1 are provided screws 21 which project into annular grooves 22 in the road wheel axle 18 by which means the road wheels 1 are secured on the road wheel axle 18 against shifting in the axial direction. In the hub of each road wheel 1 a ratchet mechanism is included which is provided with two pawls 24 loaded by spring 23 and adapted to cooperate with a ratchet wheel 25 keyed to the road wheel axle 18.

During the forward movement of the machine 10 the road wheel axle 18 is turned in unison with the road wheels 1 due to cooperation of the pawls 24 with the ratchet wheels 25, whereas during the rearward movement of the machine the pawls 24 are ineffective, so that the road wheel axle 18 is thus not turned. To one end portion of the road wheel axle 18 a clutch control collar 27, which is axially displaceable on this axle, is connected for common rotation. Into the circumferential groove of the clutch control collar 27 projects a fork 28 which is connected, by means of a bolt 29 mounted on the carrier frame 7 in a bearing socket 7' thereof, with an arm 30. This arm is connected by means of an adjusting rod 31 with a hand control lever 32 (Fig. 1) mounted on the carrier frame 7.

On the hand control lever 32 a handle 33 is rockably mounted which is connected by means of a connecting rod 34 with a locking pawl 35 pivotally arranged on the hand control lever 32. This pawl is adapted to cooperate with a toothed sector 36 mounted on the carrier frame 7, for the purpose of locking the hand control lever 32 in its various positions of adjustment. By retracting the locking pawl 35, by means of the handle 33 against the influence of a compression spring 33', the hand control lever 32 is released for being adjusted. By accordingly rocking the hand control lever 32, the clutch control collar 27 can be connected with or disconnected from the dished wheel 3, by means of the adjusting rod 31 and the fork 28, which wheel is rotatably mounted on the road wheel axle 18 but is kept from axial displacement thereon.

When the clutch control collar 27 is connected, the rotational movement of the road wheel axle 18 is transmitted to the dished wheel 3 which turns by means of its interiorly toothed rim 3' a gear wheel 4 which is mounted through the medium of its pivot pin 4' in a bearing 4'' arranged on the carrier frame 7 (Fig. 3). The gear wheel 4 transmits rotational movement to a gear wheel 5, which is also secured to the pivot pin 4' and cooperates with a pinion 6, whereby a hollow shaft 9 surrounding the road wheel axle 18 is connected with this pinion. Together with the hollow shaft 9 a support 20, 20' fastened to the second end of this shaft is turned together with forks Z'' which are secured to said support, the plane of rotation of which is perpendicular to the road wheel axle 18. Together with the hollow shaft 9 are further turned two level gear wheels 17 firmly connected to this shaft each of which meshes with a toothed rim 16 (Fig. 7). Each toothed rim 16 forms part of a hub 11' of a support 11, 11' carrying forks Z or Z', so that these forks Z, Z' also turn together with the hollow shaft 9. The supports 11, 11' and 20, 20' each forms a wheel spider carrying a fork on each arm.

As shown in Fig. 7, in each of the two supports 11, 11' a rolling friction bearing is included which bearings are parallel one to the other and each of which is provided with an outer annular race 13 and rollers 14 and is engaged by a common non-rotatable inner race block 15''. The axis of the two rolling friction bearings provided for the supports 11, 11' are obliquely disposed to the road wheel axle 18, the obliquity angles being different for the two rolling friction bearings. The two fork supports 11, 11' are accordingly inclined at different angles to the road wheel axle 18 and to the fork supports 20, 20' so that adjacent fork supports perform circulatory movements in planes extending at acute angles to each other.

The race blocks 15'' of the two roller bearings are mounted on pipe stubs 9' surrounding the hollow shaft 9. One of these pipe stubs 9' is firmly secured to the carrier frame 7 by one of its ends by means of an arm 37 on a collar 37'. The second end of this pipe stub 9' on which the race block 15'' of the roller bearing of one of the supports 11, 11' is secured, is firmly connected with one end of the second pipe stub 9' by means of the arm 15 of a collar 15' which second pipe stub 9' is fastened to a sleeve surrounding the hollow shaft 9. The two pipe stubs 9' provided and the said sleeve are thus united into a single piece by the arms 15 of the two collars 15'. This piece is secured to the carrier frame 7 by the arm 37 of the collar 37', and the race blocks 15'' of the roller bearings of the two supports 11, 11' for the forks Z and Z' are firmly secured to this tubular piece.

When the road wheel axle 18 is coupled to the road wheels 1, the forks Z, Z' and Z'' circulate as the machine is travelling, whereby the forks pick up the material to be spread, convey it upwards through a hood 8 secured to the carrier frame 7, loosen the material and fling it off rearwardly in various directions.

The number of supports with forks extending obliquely to the road wheel axle as well as that of supports with forks extending perpendicularly thereto may be varied from one up. Alternatively, these supports may be arranged on an axle different from the road wheel axle extending parallel to the latter at a distance therefrom, and the drive of which is derived from the road wheel axle or from some other source.

Various changes and modifications may be made in the practice of my invention without departing from the principle or spirit thereof, by adding customary practice and established knowledge of the art to the present disclosure and the scope of the appended claims is not to be regarded as limited except as specified therein.

I claim:

1. In a machine for spreading cut grass and like materials, a rotary axle having carrier wheels thereon, a rotary support surrounding said axle, circulatory forks for spreading the material connected to said rotary support side by side, fork supports interconnecting said rotary support and said forks and extending outwardly from said rotary support inclined at different angles to the axis of said axle for adjacent forks to rotate about said axis in planes forming an acute angle to each other, a coupling intercalated between said axle and said rotary support for transmitting the rotation of said axle to said rotary support, and means for disconnecting said coupling at will.

2. In a machine for spreading cut grass and like materials, a rotary axle having carrier wheels thereon, a rotary support surrounding said axle, circulatory forks for spreading the material connected to said rotary support side by side, fork supports interconnecting said rotary support and said forks and extending outwardly from said rotary support with adjacent fork supports inclined at different angles to the axis of said axle so that said adjacent supports rotate about said axis in planes forming an acute angle to each other, another fork support interconnecting said rotary support and another fork and extending perpendicularly to the axis of said axle so that said other fork rotates about said axis in a plane perpendicular thereto, and a disconnectible coupling intercalated between said axle and said rotary support for transmitting the rotation of said axle to said rotary support.

MARTIN NEIDHART.